June 10, 1958   W. O. HERRMANN ET AL   2,837,770
PROCESS FOR PRODUCING FILMS FROM POLYVINYL ALCOHOL
Filed July 28, 1953
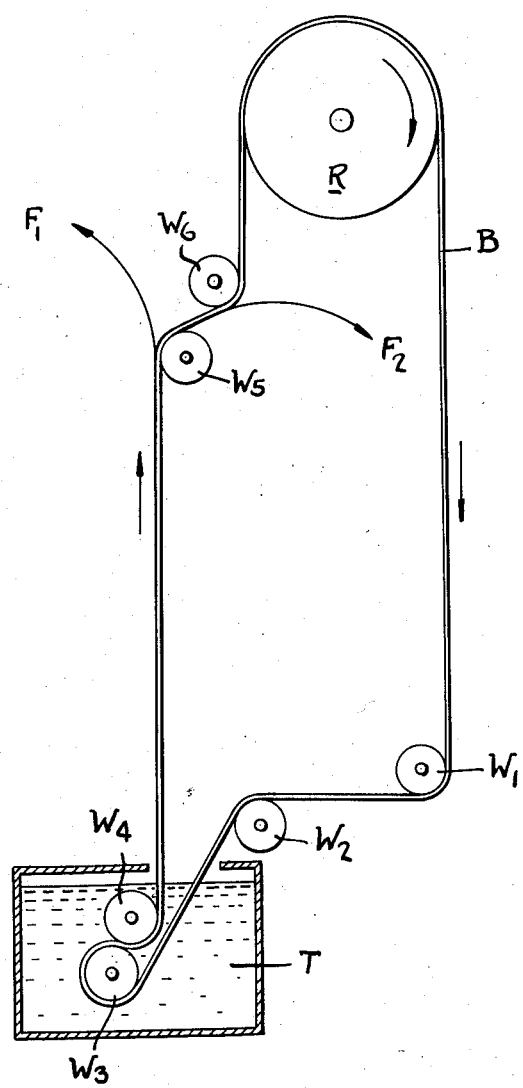
INVENTORS
WILLY O. HERRMANN
WOLFRAM HAEHNAL
BY HEINZ WINKLER
D. Malcolm
ATTORNEY

United States Patent Office 2,837,770
Patented June 10, 1958

2,837,770

PROCESS FOR PRODUCING FILMS FROM POLYVINYL ALCOHOL

Willy O. Herrmann, Wolfram Haehnel, and Heinz Winkler, Munich, Germany, assignors to Consortium für Elektrochemische Industrie G. m. b. H., Munich, Germany, a corporation Application July 28, 1953, Serial No. 370,888

Claims priority, application Germany August 7, 1952

6 Claims. (Cl. 18—57)

This invention relates to the production of films from a polyvinyl alcohol and it has for its object to provide a novel and improved process for this purpose.

Another object of the invention is to provide a simple and efficient process for continuously producing films of uniformly high quality, and of any desired thickness, from polyvinyl alcohol.

Still another object is to produce film from polyvinyl alcohol, according to the so-called dipping method in which a moving carrier such as a band or belt is passed through a bath of polyvinyl alcohol solution, by a novel process which insures complete wetting of the carrier by the solution, the consequent formation of flawless films corresponding precisely with the smooth or specially formed surface of the carrier, and, finally, the ready removal of the finished films from the carrier without damage.

Various other objects and advantages will be apparent as the nature of the invention is more fully disclosed.

It is known to produce films by the fusion and dipping method on bands or drums, in the centrifuge, and by means of precipitation. In general the preferred process depends upon the type of film-forming solution employed, since not all the processes are equally satisfactory and applicable to all film-forming substances.

Films made of polyvinyl alcohol are distinguished by a series of advantages, so that they are of great interest. However, in their production difficulties are encountered in that, among other things, the films stick to their bases with unusual tenacity, so that they cannot usually be pulled off without serious damage, and also the wettability of the bases used as carriers is generally very poor because of the polyvinyl alcohol solution, so that in the process of coating holes occur in the films.

In order to eliminate the undue adhesion on the base, a treatment of the surface of the base has been proposed, but thereby in general the wettability is still more aggravated. Besides, the base loses its required smoothness.

Because of these shortcomings, heretofore the otherwise favorable film production process, characterized by vertical guiding of the conveyor band after leaving the dipping bath, could not be used for the production of polyvinyl alcohol films.

We have now found that a complete wetting and thereby the development of a homogeneous layer results, if the polyvinyl alcohol solution is not merely brought into relatively light contact with the band or belt, but is pressed on with rollers. The adhesion of the polyvinyl alcohol solution upon the band becomes thereby entirely satisfactory for the process to be carried on successfully with vertical band conveying. The success is all the greater, the longer the polyvinyl alcohol solution is maintained under pressure against the surface of the band. This is attained according to the invention by the fact that the band in the dipping bath is conducted at the beginning of the vertical guidance not only under pressure between cooperating rollers, but the rollers are also opposed with respect to each other, at different heights, so that the rollers not only engage the band tangentially, but are also wrapped around by the guiding band over as long a segment of the rollers as possible. Thereby the rollers run inside of the dipping bath and are entirely covered by the solution.

After leaving the dipping bath opportunity is given to the solution over a short distance to run out into a smooth surface. If this does not take place automatically, it may be effected by sprinkling with water or a thin solution of polyvinyl alcohol or through treatment with moist wiping rollers and the like.

The coated band then runs into a zone where it is subjected to drying. The drying may be done by means of radiant heat, warm gas, infra-red rays or any other suitable method. The duration of the drying depends upon the solution, the speed of the band, the material of the band, the intensity of the drying, the desired final condition of the film, etc. After the drying a cooling gallery may be connected into the circuit in order to cool off the film so as to be able to pull it off the band without tension. If stronger films are desired than such as can be obtained after a single dip, it is possible to produce films of any strength by repeated dipping or the use of several dipping baths.

The dry film which is being produced is continuously being pulled off on both sides. It may be advantageous in this connection to guide the band in such a manner that, at the moment the film is pulled off the band, the band is so bent over a roll as to cause the film to be put under tension on the pull-off side of the band and thereby to come off more easily. The speed of the device winding up the pulled-off film can also be so arranged that a tautening takes place at the same time.

The pulling-off of the film may be facilitated by preparing the band with suitable known means before the coating, but the drying may be so effected as to permit the film to be smoothly removed from the band even without auxiliary means. This is influenced by a corresponding arrangement of the drying method and time, the thickness of the film and the final moistened condition, the speed and material of the band, cooling gallery, etc., and above all else by the quality of the polyvinyl alcohol used. As polyvinyl alcohol, not only its water-soluble derivatives come into consideration, but also those the solutions of which can be mixed with water.

Artificial substances, e. g. polyvinyl chloride, polyvinyl acetals, as well as metallic bands, such as steel, nickel-plated and chromium-plated steel, chrome steel and other alloys, brass, copper, etc. are suitable for the band material.

If smooth surfaces are desired, smooth, e. g. polished bands may be used, but the bands can also be provided with profiles, reliefs, grains, ornaments, patterns, letters, etc., making possible the production of films with corresponding surfaces.

It is also possible by preliminary treatment of the band surface with a dye to produce films colored only on the surface. If in case of profiles or patterns, etc., only either the deeply sunken or relief parts of the band are colored, as in the case, for instance, of known printing methods, films with colored drawings, lettering, etc., are obtained. With the use of colored polyvinyl alcohol solutions, completely colored-through films are obtained. Such dyes may be used to advantage upon which, e. g. in the case of infra-red drying, infra-red radiation have a special absorbing effect and therefore render possible a better utilization of the drying, thus, for instance, shorter drying time, higher band speed, etc.

The process may also be adapted with advantage for the production of film coatings of polyvinyl alcohol upon supports of ready-made and pre-treated foils of every type, fabrics, screens, paper and the like. For instance coated papers may be produced with ease by the method of allowing a suitable paper shortly after coating with polyvinyl alcohol solution to run toward the band with such a pressure at the conveyor band as to permit the solution to be sucked upon the paper. The drying, e. g. with infra-red rays, then takes place through the paper and the pulling off of the coated paper is effected as previously described, so that the film surface previously adjacent to the band is now the surface of the coated paper, for instance. These papers impregnated with polyvinyl alcohol are proof against oils, fats, waxes, and practically also against all solvents other than water, and they are useful for various purposes. If, instead of pure watery polyvinyl alcohol solutions, a light-sensitive solution, so made in known manner through the addition of bichromates, diazo dyes, etc., is used, light-sensitive papers are obtained.

The invention will be described in connection with the accompanying drawing which is a diagrammatic illustration of a preferred apparatus for carrying out the process.

In the drawing, the endless conveyor belt B is driven by the drum R which rotates in a clockwise direction as indicated by the arrow. $W_1$ and $W_2$ are suitable rollers which conduct the conveyor belt to the dipping bath T where it is immersed in the solution of polyvinyl alcohol. Oppositely rotating rollers $W_3$ and $W_4$ operate in the dipping bath in the coating solution and press the solution against the belt B. Roller $W_4$ is displaced somewhat in relation to roller $W_3$ (i. e., the axes of said rollers are not vertically aligned) and is mounted at a different height in order to provide a larger contact surface between the belt and roller $W_4$ when the belt is removed vertically from the dipping bath, as illustrated. The contact pressure is provided by the pressure of the belt against the rollers, the pull being provided by the motion of the belt. $W_5$ and $W_6$ are rollers rotating in opposite directions in order to strip the films $F_1$ and $F_2$ off the opposite sides of the belt B.

The process is further illustrated with the aid of the following examples.

Example 1

An endless band or belt carrier made of polyvinyl chloride was coated with a 5% Nekal solution (sodium isopropyl naphthalene sulphonate), dried, and conducted through a 70° C. heated 12% solution of a highly viscous polyvinyl alcohol in such a way that the solution was pressed upon both sides of the band by means of oppositely arranged cooperating pressure rollers. The speed of the band was about 4–5 m. per hour. After 20 cm.—counted from the surface of the band—the band was exposed on both sides to infra-red drying and the infra-red radiation was maintained over about 1 m. After a total of about 2 m. vertical distance the dry film was stripped off and the band so conducted that it was always bent to the opposite side. A clear endless film was obtained on both sides of the band, of a thickness of about $30\mu$.

Example 2

A polished copper band was conducted as described in Example 1, at about 80–90° C. through a 15% solution of a highly viscous polyvinyl alcohol and thereupon dried, as previously described. A clear endless film was obtained on both sides, of a thickness of about $50\mu$.

Example 3

A chrome-nickel steel band of a thickness of about 0.2 mm., was drawn as described in Example 1, through a 15% solution of a medium viscous polyvinyl alcohol at about 80–90° C. At 10 cm. above the bath surface an endless paper strip was conducted against the coated band with light pressure and thereby stuck on the polyvinyl alcohol coating. After the previously described drying, a paper was pulled off which was coated with a layer of polyvinyl alcohol of about $30\mu$.

Although certain specific examples of our process have been described herein for purposes of illustration, it will be evident to those skilled in the art that the invention is capable of various modifications and adaptations within the scope of the appended claims.

The invention claimed is:

1. Process for producing films from a solution of polyvinyl alcohol which comprises dipping a carrier into a bath of said solution, and pressing said solution upon said carrier with a rolling pressure while said carrier is submerged in said bath.

2. Process for producing films from a solution of polyvinyl alcohol which comprises moving a submerged band through a bath of said solution, pressing said solution upon said band with a rolling pressure while said band is submerged in said bath, and removing the film-coated band vertically from said solution.

3. Process according to claim 2, in which the band is pressed between two rolling pressure surfaces disposed at different elevations with respect to each other in said solution.

4. Process for producing films from a solution of polyvinyl alcohol which comprises moving a conveyor band through a bath of said solution, pressing said solution upon both sides of said band with a rolling pressure while said band is submerged in said bath, removing the film-coated band from said solution, drying said coated band, and stripping the film off said band.

5. Process for producing films from a solution of polyvinyl alcohol which comprises moving a conveyor band through a bath of said solution, pressing said solution upon both sides of said band with a rolling pressure while said band is submerged in said bath, removing the film-coated band from said solution, drying said coated band, and subjecting the latter to a repetition of the foregoing process to produce films of optional thickness.

6. Process for producing films from a solution of polyvinyl alcohol which comprises moving a conveyor band through a bath of said solution, pressing said solution upon both sides of said band with a rolling pressure while said band is submerged in said bath, removing the film-coated band vertically from said solution, drying said coated band, and stripping the film off both sides of said band while moving the latter first away from one film and then away from the other film.

References Cited in the file of this patent

UNITED STATES PATENTS

| | | |
|---|---|---|
| 1,910,521 | Coleman | May 23, 1933 |
| 2,120,720 | Spanel | June 14, 1938 |
| 2,133,821 | Kratz | Oct. 18, 1938 |
| 2,170,441 | Albright | Aug. 22, 1939 |
| 2,405,977 | Peters | Aug. 20, 1946 |
| 2,419,281 | Noble | Apr. 22, 1947 |
| 2,567,952 | Lewis | Sept. 18, 1951 |